Figure 1:
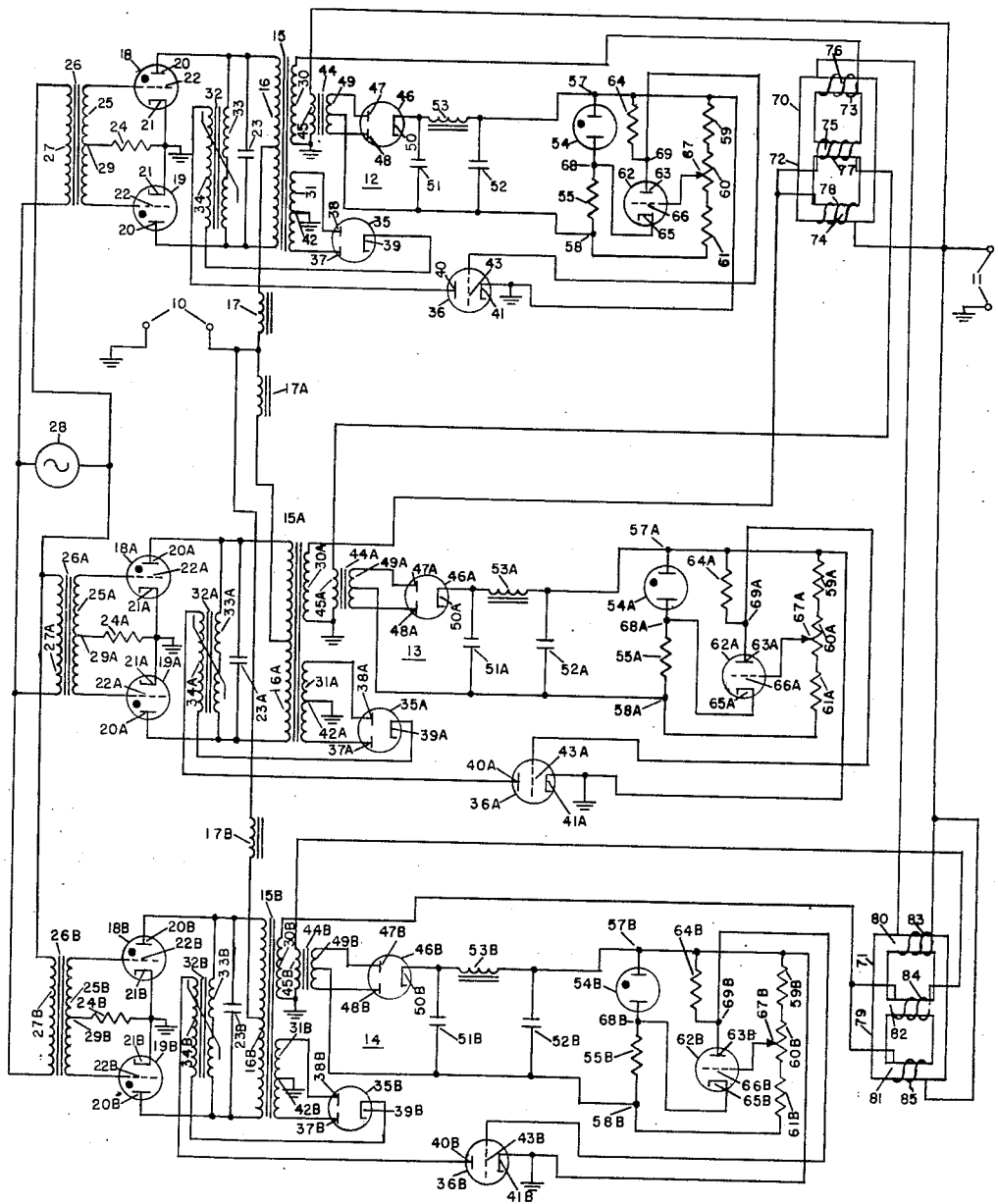

Feb. 18, 1958

W. J. HOLT, JR 2,824,274

ELECTRIC TRANSLATING SYSTEM

Filed Dec. 15, 1952

2 Sheets-Sheet 1

*INVENTOR.*
WILLIAM J. HOLT JR.
BY
*ATTORNEY*

Feb. 18, 1958 W. J. HOLT, JR 2,824,274
ELECTRIC TRANSLATING SYSTEM
Filed Dec. 15, 1952 2 Sheets-Sheet 2

INVENTOR.
WILLIAM J. HOLT JR.
BY
ATTORNEY

United States Patent Office 2,824,274
Patented Feb. 18, 1958

2,824,274

ELECTRIC TRANSLATING SYSTEM

William J. Holt, Jr., Garland, Tex., assignor to Varo Mfg. Co., Inc., Garland, Tex.

Application December 15, 1952, Serial No. 326,009.

11 Claims. (Cl. 321—27)

This invention relates to electric translating systems and more particularly to electric translating systems for transmitting energy from a direct current supply circuit to an alternating current load circuit.

Electric translating apparatuses of the parallel inverter type disclosed in my co-pending application, Serial Number 107,733, filed July 30, 1949, Patent Number 2,638,569, issued May 12, 1953, can transmit only limited amounts of energy from a direct current supply circuit to an alternating current load circuit due to the current carrying limitations of the various components of such apparatuses and especially of the gaseous discharge valves which are connected in parallel across the direct current supply circuit. In certain installations which require the transmittal of large amounts of energy between the direct current supply circuit and the alternating current load circuit, it is desirable to connect a plurality of such apparatuses in parallel between the supply and load circuits. It is necessary that the alternating current outputs of such parallel connected apparatuses be in phase with one another and that each of the apparatuses transmit a predetermined proportion of the total energy supplied to the load circuit regardless of fluctuation in the voltage of the supply circuit. It is desirable therefore to provide an electric translating system for transmitting large amounts of energy from a direct current supply circuit to an alternating current load circuit which comprises a plurality of inverters each of which transmits a predetermined proportion of the total energy supplied to the load circuit.

Accordingly, it is an object of the invention to provide a new and improved electric translating system for transmitting energy from a direct current supply circuit to an alternating current load circuit.

It is another object of the invention to provide a new and improved electric translating system for transmitting large amounts of current from a direct current supply circuit to an alternating current load circuit.

It is still another object of the invention to provide a new and improved electric translating system having a plurality of parallel type inverters connected in parallel between a direct current supply circuit and an alternating current load circuit.

It is a further object of the invention to provide a new and improved electric translating system having a plurality of parallel type inverters connected in parallel between a direct current supply circuit and an alternating current load circuit and having control means for predetermining the proportion of the total energy supplied to the load circuit by each of the inverters.

It is a still further object of the invention to provide a new and improved electric translating system having a plurality of inverters connected in parallel between a direct current supply circuit and a single phase alternating current load circuit and having control means for predetermining the proportion of the total energy supplied to the load circuit by each of the inverters.

It is another object of the invention to provide a new and improved electric translating system having a plurality of inverters connected in parallel between a direct current supply circuit and a three phase alternating current load circuit and having control means for predetermining the proportion of the total energy supplied to the load circuit by each of the inverters.

Briefly stated, the new and improved electric translating system comprises a plurality of inverters of the parallel type connected in parallel between a direct current supply circuit and a single phase alternating current load circuit. One of these inverters may be termed the "master" inverter and the others "slave" inverters. Each of the inverters includes a pair of electric valves connected in parallel which are rendered alternately conductive by an alternating potential impressed on their control grids from an alternating current source of the desired frequency. The alternating potentials impressed on the control grids of the electric valves of the inverters are supplied from a common source so that the alternating current outputs of the inverters are in phase. The master inverter is provided with a voltage regulating means which tends to maintain the voltage of the load circuit substantially constant. A plurality of current balance sensing transformers is provided each of which has a secondary winding in which is induced a voltage which varies in accordance with the difference in the amount of current supplied to the load circuit by the master inverter and one of the slave inverters. The secondary winding of each of the current balance sensing transformers is connected to the voltage regulating means of its associated slave inverter to vary the voltage of the output of the slave inverter in accordance with the variations in the difference in the amounts of current supplied to the load circuit by the master inverter and the slave inverter to maintain substantially constant the predetermined proportion of the total current supplied to load circuit by each slave inverter.

In another embodiment of the invention a master inverter and two slave inverters are connected in parallel between a direct current supply and a three phase alternating current load circuit. Each of the inverters includes a pair of electric valves connected in parallel which are rendered alternately conductive by alternating potentials impressed on their control grids from an alternating current source of the desired frequency. These alternating potentials are properly displaced in phase by phase shifting circuits so that the alternating current outputs of the inverters differ in phase by 120 electrical degrees from one another. The master inverter is provided with a voltage regulating means which tends to maintain the voltage of the load circuit substantially constant. Each of the slave inverters is provided with a current balance or ratio sensing circuit for producing a control voltage or potential which varies in accordance with the balance or ratio between the alternating current output of each inverter and the alternating current output of the master inverter. The control voltages or potentials are fed to the voltage regulating means of each of the slave inverters to maintain substantially constant the predetermined balance or ratio.

Figure 2:
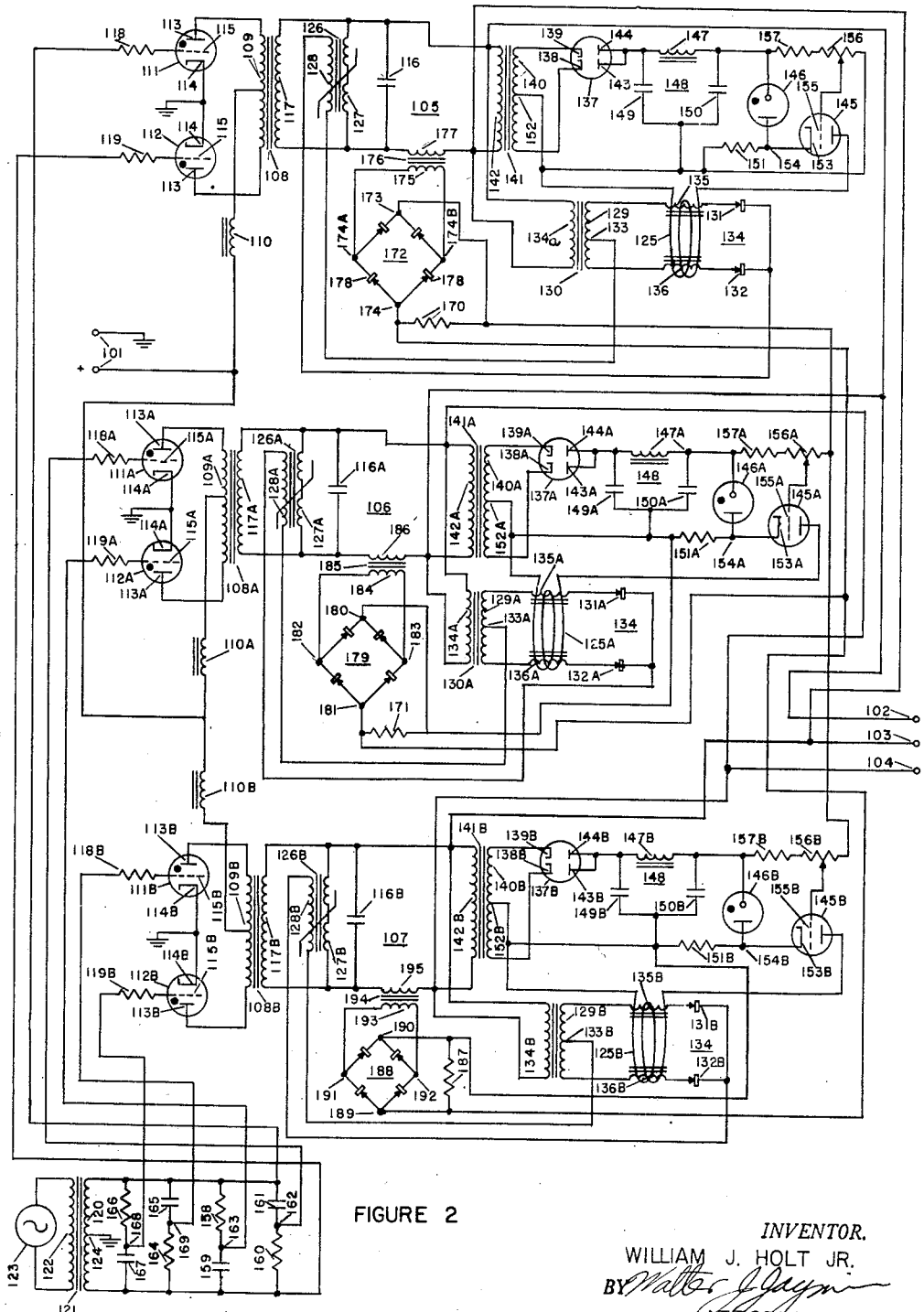

For a better understanding of the invention, reference may be had to the following description taken in connection with the accompanying drawing and its scope is pointed out in the appended claims. In the drawing, Figure 1 illustrates diagrammatically the electric translating system for transmitting energy from a direct current supply circuit to a single phase alternating current load circuit; Figure 2 illustrates diagrammatically the electric translating system for transmitting energy from a direct current supply circuit to a three phase alternating current load circuit.

Referring now to the drawing, the electric translating system for transmitting energy from a direct current supply circuit 10 to an alternating current load circuit 11 includes a plurality of inverters 12, 13, and 14 connected in parallel between the supply and load circuits 10 and 11. The inverter 12 may be termed the "master" inverter and the inverters 13 and 14 may be termed "slave" inverters for reasons which will be developed below. The master inverter includes a transformer 15 provided with a primary winding 16 having its electrical midpoint connected to one side of the supply circuit through a smoothing reactor 17 and end terminals connected to the other side of the supply circuit through electric valves 18 and 19. Electric valves 18 and 19 are each provided with an anode 20, a cathode 21, and a control grid 22. Commutating capacitor 23 is connected between the anodes 20 of the electric valves. The electric valves are preferably of the gaseous discharge type.

In order periodically to render the electric valves 18 and 19 alternately conductive and non-conductive, their control grids 22 are connected to their common cathode circuit through current limiting resistance 24 and opposite halves of the secondary winding 25 of a grid drive transformer 26 whose primary winding 27 is connected to a source 28 of alternating current of the desired frequency. The current limiting resistance 24 is connected between the electrical midpoint 29 of the secondary winding 25 and the cathodes 21 of the electric valves to provide a high resistance path for current flow from the cathodes 21 to the control grids 22.

The general principle of operation of the master inverter will be well understood by those skilled in the art. In brief, if one of the electric valves, for example, the valve 18, is initially rendered conductive, current will flow through the upper portion of the primary winding 16 and the electric valve 18, inducing one-half cycle of alternating current in the secondary windings 30 and 31 of the transformer 15. During this interval, the capacitor 23 becomes charged to substantially twice the potential of the direct current supply circuit 10 and when the grid potential supplied by the secondary winding 25 reverses polarity to render the valve 18 conductive, the potential of capacitor 23 is effective to commutate the current from the valve 18 to the valve 19. Current then flows through the lower portion of winding 16 inducing a half cycle of alternating current of opposite polarity in the secondary windings 30 and 31. In this manner the current is successively commutated between the valves 18 and 19 and alternating currents are induced in the secondary windings of the transformer 15.

The voltage induced in secondary winding 30 is maintained substantially constant by means of a saturable reactor 32 whose reactive winding 33 is connected across the commutating capacitor 23 and whose saturating winding 34 is supplied with direct current from a rectifier 35 through a control electric discharge means 36. The rectifier 35 may be an electric discharge means having a pair of anodes 37 and 38 connected to the opposite ends of the secondary winding 31 and a cathode 39 connected to one side of the saturating winding. The control electric discharge means 36 includes an anode 40 connected to the other side of the saturating winding, a cathode 41 connected to the electrical midpoint 42 of the secondary winding 31, and a control member or grid 43. If the impedance of the saturable reactor 32 is increased, the voltage across the primary winding 16 is increased. As a result, the voltage across the secondary winding 30 is also increased. Conversely, if the impedance of the saturable reactor is decreased, the voltage across secondary winding 30 is decreased. The impedance of saturable reactor can be controlled by varying the conductivity of the control electric discharge means 36. If the conductivity of electric discharge means 36 increases with an increase of the voltage 11, the current flowing in the saturating winding 34 is increased and the impedance of saturable reactor 32 is decreased. This causes a decrease in the voltage induced in the secondary windings 30 and 31, therefore a decrease in the voltage of the alternating current load circuit. On the other hand, if the conductivity of the control electric discharge means 36 is decreased, the impedance of the saturable reactor 32 is increased and the voltage of the alternating current load circuit is increased.

The control means for varying the conductivity of electric discharge means 36 in accordance with the voltage of the load circuit includes a voltage sensing transformer 44 having a primary winding 45 connected across the load circuit. A rectifier electric discharge means 46 has anodes 47 and 48 connected to opposite ends of the secondary winding 49 of the voltage sensing transformer and a cathode 50. A filter which may comprise a pair of capacitors 51 and 52, and a reactor 53 is provided to smooth the output of the rectifier electric discharge means 46. A glow discharge means 54 and a resistance 55 are connected in series across the output terminals 57 and 58 of the rectifier 46 and comprise a voltage divider bridge. Three serially connected resistances 59, 60, and 61, are also connected across the output terminals 57 and 58. An electric discharge means 62 has an anode 63 connected to the terminal 57 through a resistance 64 and a cathode 65 connected to the other terminal through resistance 55.

The control grid 66 of the electric discharge means 62 is connected to the resistance 60 through an adjustable contact 67 in order that a potential be impressed on the control grid 66 which varies a fixed fraction of the variations in the voltage across the terminals. Since the cathode 65 is connected to the common juncture or connection 68 of the glow discharge means 54 and the resistance 55, the total variations in the voltage across the terminals 57 and 58 will be impressed on the cathode 65 because the voltage drop across the glow discharge means 54 will remain constant. The variation in the potential of the cathode 65 will therefore be the main factor affecting the conductivity of the electric discharge means 62. For example, if the voltage across the terminals 57 and 58 increases a certain amount, the potential of the cathode 65 will also become more positive or less negative by the same amount. The potential impressed on the control grid 66 will also become more positive or less negative but only by a fraction of the amount of the change in the voltage across the terminals. In effect, the control grid 66 becomes more negative with respect to the cathode 65 and the conductivity of the electric discharge means 62 is decreased. If the voltage across the terminals drops, the conductivity of the electric discharge means 62 is increased. Since the control grid 43 of the control electric discharge means 36 is connected to the common juncture or connection 69 of the resistance 64 and the anode 63, the conductivity of the control electric discharge means 36 will vary indirectly as the conductivity of the electric discharge means 62 increases when the conductivity of the electric discharge means decreases and vice versa.

It will be apparent now that if the voltage across the load circuit 11 increases, the electric discharge means 62 becomes less conductive, the control electric discharge means 36 becomes more conductive and, as a result, more current flows through the saturating winding 34 of the saturable reactor 32 decreasing the impedance of the inductive winding 33 of the reactor 32. The voltage of the load circuit therefore decreases. Conversely, if the voltage across the load circuit decreases, the electric discharge means becomes less conductive, and, therefore, less current flows through the saturating winding. The impedance of the inductive winding 33 increases causing the voltage across the load circuit to increase. In this manner, the voltage of the load circuit 11 is maintained substantially constant.

Either, or both, the commutating capacitor 23 and the saturable reactor 32 can be connected across the secondary winding 30 if desired; the commutating capacitor and the saturable reactor each being capable of performing its function regardless of whether it is connected across the primary winding or the secondary winding of the transformer 15.

The slave inverters 13 and 14 and their control circuits are substantial duplicates of the master inverter and its control circuit and, therefore, in order to avoid prolixity, corresponding elements of the inverters and their control circuits have been provided with the same reference numerals, the letter "a" being added to the reference numerals of the corresponding elements of the inverter 13, and the letter "b" being added to the reference numerals of such corresponding elements of the inverter 14.

Since it is desirable that each of the inverters transmit a predetermined proportion of the total energy supplied to the load circuit 11, the current balances between the output of the slave inverters 13 and 14 and that of the master inverter 12 are sensed by the current balance sensing transformers 70 and 71, respectively. The transformer 70 includes a core 72 having outer legs 73 and 74 and a center leg 75. The winding 76 on the outer leg 73 is connected in series with the secondary winding 30 so that the alternating current output of the master inverter flows through the winding 76 and induces a magnetic flux in the legs 73 and 75, which tends to induce an alternating voltage of one phase in the control winding 77 disposed on the center leg 75. The winding 78 on the outer leg 74 is connected in series with the secondary winding 30a so that the alternating current output of the slave inverter 13 flows through the winding 78 and induces a magnetic flux in the legs 74 and 75 which tends to induce an alternating voltage of the opposite phase in the control winding 77. The control winding 77 is connected in series with the winding 45a of the transformer 44a across the winding 30a so that the voltage induced in the primary winding 49a is a resultant of the voltage and phase of the alternating voltage in the control winding 77 and of the alternating voltage of the winding 30a. The winding 45a and 77 are connected across the winding 30a in order that a predetermined potential be applied to the control grid 43a of the control electric discharge means 36a so that current of a predetermined value flows through the saturating winding 34a of the saturable reactor 32a when no alternating current is induced in the control winding 77. This condition occurs when the alternating current outputs of the master inverter 12 and the slave inverter 13 are equal or balanced.

If the output of the slave inverter 13 now increases so that it exceeds that of the master inverter 12, and alternating voltage is induced in the control winding 77 which varies as the difference in the outputs and which is of the same phase as the alternating voltage induced in the winding 30a. As a result, the alternating voltage induced in winding 49a increases, the electric discharge means 36a is rendered more conductive and transmits more current to the saturating winding 34a, and the voltage induced in the winding 30a decreases, the alternating current output of the slave inverter thus decreasing until it substantially equals the output of the master inverter.

If the output of the slave inverter now decreases so that it is less than that of the master inverter, and alternating voltage is induced in the control winding 77 which varies as the difference in the outputs and which is of the opposite phase as the alternating voltage induced in the winding 30a. As a result, the alternating voltage induced in winding 49a decreases, the electric discharge means 62a becomes more conductive, the control electric discharge means 36a is rendered less conductive and transmits less current to the saturating winding 34a and the voltage induced in the winding 30a increases the alternating current output of the slave inverter 13, thus decreasing until it substantially equals the output of the master inverter. In this manner, the outputs of the slave and master inverters are kept balanced.

It will be noted that the alternating current output of the slave inverter is varied in accordance with the variations in the balance between the outputs of the master and slave inverters, by varying the voltage of the alternating current output of the slave inverter. The voltage of the output circuit 11 is maintained constant by the voltage control circuit of the master inverter.

The current balance sensing transformer 71 similarly controls the output voltage of the slave inverter 14 to maintain constant the current balance between the outputs of the master inverter and the slave inverter. The transformer 71 includes a core 79 having outer legs 80 and 81 and a center leg 82. A primary winding 83 is disposed on the outer leg 80 and is connected in series with the primary winding 76 of the transformer 70 and the secondary winding 30 of the master inverter so that an alternating magnetic flux is induced in the outer leg 80 and the control leg 82 of the core which varies in accordance with the alternating current output of the master inverter and tends to induce an alternating voltage of one phase or polarity in the secondary winding 84 and of the center leg 82. A winding 85 is disposed on the outer leg 81 and is connected in series with the secondary winding 30b of the slave inverter 14 so that an alternating magnetic flux is induced in the outer leg 81 and the control leg 82 which tends to induce an alternating voltage of the opposite phase or polarity in the secondary winding 84. The secondary winding 84 is connected in series with the winding 45b of the transformer 44b across the winding 30b so that the voltage induced in the primary winding 49b is a resultant of the voltage and phase of the alternating voltage in the secondary winding 84 and of the alternating voltage of the winding 30b.

The output of the slave inverter 14 is controlled in exactly the same manner as that of the slave inverter 14 in accordance with the variations in the balance between the alternating current outputs of the master inverter and of the slave inverter in order to maintain a predetermined balance therebetween.

It will now be apparent that the master inverter 12 and the slave inverters 13 and 14 each transmit a predetermined proportion of the total energy supplied to the load circuit 11 from the supply circuit 10. It will also be apparent that each of the inverters is capable of operating independently to energize a constant voltage alternating current load circuit when its winding 45, 45a or 45b, as the case may be, is connected across the load circuit 11, and that these inverters can be easily connected in parallel between a direct current supply and an alternating current load circuit by connecting the windings of two of the inverters, 45a and 45b in series with suitable secondary windings of current balance sensing transformers in which are induced control voltages which vary in accordance with the variations in the balances between the alternating current outputs of the two inverters and the third inverter and that the control voltages are employed to vary the voltage of the alternating current outputs of the two inverters to maintain substantially constant the balances between the amounts of current transmitted to the load circuit by each of the two inverters and the third inverter.

Although in the illustrated and described system, the three inverters, 12, 13, and 14, transmit equal amounts of alternating current, it will be apparent that the balance between the alternating current outputs of the master inverters and each of the slave inverters may be set at any predetermined ratio by varying the ratio of the number of turns in the primary winding 74 to the number of turns in the primary winding 76, and by varying the ratio of the number of turns in the primary winding 83 to the number of turns in the primary winding 85. For example, if the number of turns in the primary winding 74 is twice the number of turns in the primary winding 76, the master inverter 12 will deliver twice as much current to the load circuit as the slave inverter 13. Similarly, by varying the ratio of the number of turns in the secondary winding 83 to the number of turns in the secondary winding 85, the balance between the amounts of current transmitted to the load circuit by the master inverter and the slave inverter 14 may be set at any predetermined ratio. These variations in the ratios of the amounts of current transmitter by the inverters may be necessary or desirable where the inverters are of different capacities and it is desired to utilize each inverter at its optimum operating conditions.

Moreover, it will be apparent that any number of slave inverters may be connected in parallel with the master inverter between the supply circuit and the load circuit, it being necessary to provide an additional current balance sensing transformer for each additional slave inverter added. For example, if only one slave inverter is connected in parallel with the master inverter, only one current balance sensing transformer is needed; if three slave inverters are connected in parallel, three current balance sensing transformers are needed, and so on.

In Figure 2 is illustrated an electric translating system for transmitting energy from a direct current supply circuit 101 to a polyphase alternating current load circuit having terminals 102, 103, and 104 which includes a master inverter 105 and slave inverters 106 and 107. The master inverter 105 includes a transformer 108 provided with a primary winding 109 having its electrical midpoint connected to one side of the supply circuit through a smoothing reactor 110 and end terminals connected to the other side of the supply circuit through electric valves 111 and 112. Electric valves 111 and 112 are each provided with an anode 113, and a cathode 114, and a control grid 115. A commutating capacitor 116 is connected across the secondary winding 117 of the transformer 108. The electric valves are preferably of the gaseous discharge type.

In order periodically to render the electric valves 111 and 112 alternately conductive and non-conductive, their control grids 115 are connected to their common cathode circuit through current limiting resistances 118 and 119 and opposite halves of the secondary winding 120 of a grid drive transformer 121 whose primary winding 122 is connected to any suitable source 123 of alternating current of the desired frequency. The electrical midpoint 124 of the secondary winding 120 and the cathodes 114 are connected to ground.

The master inverter 105 operates in the same manner as the inverters illustrated in Figure 1, the commutating capacitor 116 being effective to commutate the current from one electric valve 11 or 112 to the other electric valve when the other electric valve is rendered conductive by the alternating potential applied to the control grids 115 of the electric valves.

The voltage induced in the secondary winding 117 is regulated by means of a saturable reactor 126 whose reactive windings 127 are connected across the secondary winding 117 and whose saturating winding 128 is supplied from a secondary winding 129 of a transformer 130 having a pair of rectifiers 131 and 132 between its end terminals and one side of the saturating winding 128. The other side of the saturating winding is connected to the electrical midpoint 133 of the secondary winding 129. The primary winding 134a of the transformer 130 is connected across the secondary winding 117.

The amount of direct current flowing through the saturating winding 128 is controlled by a magnetic amplifier 134 whose reactive windings 135 and 136 are connected in series with the rectifiers 131 and 132. The impedance of the reactive windings varies in accordance with the amount of direct current flowing in the control winding 125. The control winding is supplied with direct current by a full wave rectifier 137 whose cathodes 138 and 139 are connected to opposite sides of the secondary winding 140 of a transformer 141 whose primary winding 142 is connected across the secondary winding 117. One side of the control winding is connected to the anodes 143 and 144 of the rectifier through a control electric discharge means 145 and a glow discharge means 146 as well as the reactor 147 of a filter 148 which also includes the capacitors 149 and 150. The glow discharge means, which acts as a voltage regulator, is connected in series with a resistance 151 between the anodes 143 and 144 and the electrical midpoint 152 of the secondary winding 140.

The cathode 153 of the control electric discharge means 145 is connected to the common juncture or connection 154 of the glow discharge means 146 so that it is maintained at a substantially constant potential regardless of the variations in the voltage across the secondary winding 117 and therefore across the terminals 102 and 103 of the output circuit. The control grid or control member 155 of the control electric discharge means 145 is connected through an adjustable contact 156 to a resistance 157 connected between the anodes of the rectifier 137 and the electrical midpoint 152 of the secondary winding 140 so that the potential impressed on the control member 155 varies directly in accordance with the voltage across the secondary winding 117 and therefore of the voltage across the terminals 102 and 103 of the output circuit.

Assuming now that the master inverter 105 is in operation and applying an alternating voltage of predetermined value to the output circuit, the control electric discharge means is transmitting a certain amount of current to the control winding 125 of the magnetic amplifier and the impedance of the reactive windings is of such value that the amount of direct current transmitted to the saturating winding 128 of the saturable reactor 126 is maintaining the impedance of the reactive winding 127 at a value such that the alternating voltage output of the master inverter is of the desired predetermined value.

If the voltage across the terminal 102 and 103 tends to ride above the predetermined value, the potential impressed on the control member 155 becomes less negative while the potential of the cathode 153 remains substantially constant due to the voltage regulating action of the glow discharge means 146. As a result, the conductivity of the electric discharge means 145 is increased and more current flows through the control winding 125 of the magnetic amplifier. The impedance of the reactive windings 135 and 136 of the magnetic amplifier is decreased and the amount of current transmitted to the saturating winding 128 by the rectifiers 131 and 132 is increased. This increase in the amount of current in the saturating windings decreases the impedance of the reactive windings 127 of the saturable reactor and the alternating voltage across the output terminals 102 and 103 therefore decreases to the predetermined value.

Conversely, if the voltage across the terminals 102 and 103 tends to fall below the predetermined value, the potential impressed on the control member 155 becomes more negative while the potential of the cathode remains substantially constant due to the voltage regulating action of the glow discharge means 146. As a result, the conductivity of the control electric discharge means 145 is decreased and less current flows through the control winding 125 of the magnetic amplifier. The impedance of the reactive windings 135 and 136 of the magnetic amplifier is thus increased and the amount of current transmitted to the saturating winding 128 by the rectifiers 131 and 132 is decreased. This increases the impedance of the reactive windings 127 of the saturable reactor and the alternating voltage across the terminals 102 and 103 therefore rises to the predetermined value. In this manner, the voltage across the terminals 102 and 103 is maintained constant.

The slave inverters 106 and 107 are substantial duplicates of the master inverter 105, and therefore, corresponding elements of slave inverters and the master inverter have been provided with the same reference numerals, the letter "a" being added to each reference numeral of each such corresponding element of the slave inverter 106 and the letter "b" being added to each reference numeral of each such corresponding element of the above inverter 107.

The secondary winding 117a of the slave inverter 106 is connected to the terminals 102 and 104 to energize one phase of the output circuit and the secondary winding 117b of the slave inverter 107 is connected to the terminals 103 and 104 to energize another phase of the output circuit. In order that the phases of the alternating voltages of the master inverter and the slave inverters be displaced by 120 electrical degrees, the control members 115a of the electric valves 111a and 112a of the slave inverter 106 are connected to the secondary winding 120 of the grid drive transformer through the phase shifting circuits which include the resistance 158 and capacitor 159 connected in series across the secondary winding 120 and the resistance 160 and capacitance 161 which are also connected in series across the secondary winding 120. The control member 115a of the electric valve 11a is connected to the common connection 162 of the resistance 160 and the capacitor 161 while the control member 115a of the electric valve 112a is connected to the common connection 163 of the resistance 158 and the capacitor 159.

The control member 115b of the electric valves 111b and 112b are similarly connected to the secondary winding 120 of the grid drive transformer through the shifting circuits which include the resistance 164 and the capacitance 165 connected in series across the secondary winding 120 and the resistance 166 and the capacitor 167 which are also connected in series across the secondary winding 120. The control member 115b of the electric valve 112b is connected to the common connection 168 of the resistance 166 and the capacitor 167 while the control member 115b of the electric valve 111b is connected to the common connection 169 of the resistance 164 and the capacitance 165.

The alternating potentials impressed on the control members of the electric valves of the three inverters are thus separated in phase by the phase shifting circuits so that three phase alternating voltage appears across the output terminals 102, 103, and 104.

In order to maintain a proper balance between the alternating current output of the master inverter 105 and the alternating current output of the slave inverters 106, a pair of resistances 170 and 171 are connected in series with the resistance 157a of the slave inverter 106 between the anodes 144a of the rectifier 137a and the electrical midpoint 152a of the secondary winding 140a. A direct current potential of one polarity which varies in accordance with the alternating current output of the master inverter is impressed across the resistance 170 by means of the rectifier 172 whose output terminals 173 and 174 are connected to opposite sides of the resistance 170 and whose input terminals 174a and 174b are connected to opposite sides of the secondary winding 175 of a transformer 176 whose primary winding 177 is connected in series with the secondary winding 117 of the transformer 108 of the master inverter. The rectifier 172 may include a plurality of selenium rectifiers 178 connected in the usual way so that the rectifier 172 acts as a full wave rectifier.

A direct current potential of the opposite polarity, which varies in accordance with the alternating current output of the slave inverter 106, is impressed across the resistance 171 by means of the rectifier 179 whose output terminals 180 and 181 are connected to opposite sides of the resistance 171, and whose terminals 182 and 183 are connected to opposite sides of the secondary winding 184 of a transformer 185 whose primary winding 186 is connected in series with the secondary winding 117a of the transformer 108a of the slave inverter 106.

It will be evident now that the potential impressed on the control member 155a of the control electric discharge means 145a will vary not only in accordance with the alternating voltage of the output of the slave inverter but also with the balance between the alternating current outputs of the master inverter and of the slave inverter, since the potentials applied across the resistances 170 and 171 are of opposite polarities. For example, if it be assumed that system is in operation, that the inverters are supplying equal predetermined amounts of alternating current to the output terminals 102, 103, and 104, the potentials impressed across the resistances 170 and 171 are of such value that the potential impressed on the control member 155a maintains the conductivity of the electric discharge means 145a at a certain value. If the alternating current output of the slave inverter now tends to increase above the predetermined while that of the master inverter stays constant, the potential across the resistance 171 also increases while the potential across the resistance 170 remains constant. As a result, a less negative potential is impressed on the control member 155a, the control electric discharge device 145a is rendered more conductive and direct current flows through the saturating winding 128a of the saturable reactor 126a and the impedance of the reactive windings 127a is decreased thus decreasing the alternating current output to the predetermined value. Conversely, if the alternating current output of the slave inverter decreases, the control electric discharge means 145a is rendered less conductive, the amount of direct current in the saturating winding 128a is decreased and the impedance of the reactive winding 127a is increased, thus increasing the alternating current output of the slave inverter 106 to the predetermined value. Similarly, if the alternating current output of the master inverter 105 tends to vary from the predetermined value, the conductivity of the control electric discharge means 145a will be varied to vary the alternating current output of the slave inverter 106 in accordance with the variations of the alternating current output of the master inverter and maintain the alternating current output of the slave inverter equal to that of the master inverter. It will be apparent that in this latter case, the alternating current output of the two inverters will vary simultaneously but in the same degree and in the same direction so that in all cases the balance or ratio between the alternating current output of the two inverters will be maintained constant.

It will be apparent that the ratio between the alternating current outputs of the master inverter and the slave inverter need not be one to one, but may be set at any predetermined value by proper choice of the number of turns in the primary windings 177 and 186. For example, if the primary winding 177 has twice as many turns as the primary winding 186 when the secondary windings 175 and 184 have equal numbers of turns, the alternating current output of the slave inverter will be twice as great as that of the master inverter and this one to two current balance or ratio will be maintained constant as described above.

The balance or ratio between the alternating current outputs of the master inverter 105 and the slave inverter 107 is similarly regulated. The resistance 170 and the resistance 187 are connected in series with the resistance 157b of the slave inverter 107 between the anodes 144b of the rectifier 137b and the electric midpoint 152b of the secondary winding 140b.

A direct current potential of a polarity opposite that impressed across the resistance 170, which varies in accordance with the alternating current output of the slave inverter 107 is impressed across the resistance 187 by means of the rectifier 188 whose output terminals 189 and 190 are connected to opposite sides of the resistance 187 and whose input terminals 191 and 192 are connected to opposite sides of the secondary winding 193 of a transformer 194 whose primary winding 195 is connected in series with the secondary winding 117b of the transformer 108b of the slave inverter 107.

It will be apparent that a predetermined ratio or balance between the alternating current output of the master inverter and of the slave inverter 107 is maintained constant in the same manner as is maintained constant the predetermined ratio or balance between the alternating current outputs of the master inverter and the slave inverter 106.

It will be seen now that an electric translating system has been provided for transmitting energy from a direct current supply circuit to a three phase alternating current load circuit which includes a master inverter 105 and a pair of slave inverters 106 and 107 connected in parallel between the supply and load circuits. It will also be seen that the master inverter is provided with a voltage regulating means which maintains the voltage of the three phase output circuit substantially constant and that a current balance sensing circuit is provided to detect the balance or ratio between the alternating current outputs of the master inverter 105 and of the slave inverters 106 and 107 and provides constant voltages which are impressed on the control members 155a and 155b of the control electric discharge means 145a and 145b respectively, to maintain the balance between the alternating current output of the master inverter and the slave inverters substantially constant.

It will be obvious to those skilled in the art that various changes and modifications may be made in the illustrated and described embodiments of the invention without departing from the invention and it is intended, therefore, in the appended claims to cover all such changes and modifications which fall within the true spirit and scope of the invention.

What I claim as new and desire to secure by Letters Patent of the United States is:

1. An electric translating system for transmitting energy from a direct supply circuit to an alternating load circuit comprising, a plurality of inverters connected in parallel between said supply circuit and said load circuit, each of said inverters having a voltage regulating means, the voltage regulating means of one of said inverters being responsive to the voltage of said load circuit to maintain constant the voltage of said load circuit; current balance sensing means for detecting variations in the ratio between the amounts of current transmitted to the load circuit by one of the said inverters and individually every one of the remainder of said inverters, said voltage regulating means of every one of the remainder of said inverters being controlled by its associated current balance sensing means to maintain substantially constant the ratios between the amounts of current transmitted to the load circuit by said one of said inverters and individually every one of the remainder of said inverters.

2. An electric translating system for transmitting energy from a direct current supply circuit to an alternating current load circuit comprising, a pair of inverters connected in parallel between said supply circuit and said load circuit, each of said inverters having a voltage regulating means, the voltage regulating means of one of said pair of inverters being responsive to the voltage of said load circuit for maintaining constant the voltage of said load circuit; a current balance sensing means for detecting variations in the ratio between the amounts of current transmitted by said inverters, the voltage regulating means of the other of said pair of inverters being controlled by said current balance sensing means to vary the voltage of the output of said other of said pair of inverters in accordance with said ratio to maintain said ratio constant.

3. An electric translating system for transmitting energy from a direct current supply circuit to an alternating current load system comprising, a pair of inverters connected in parallel between said supply circuit and said load circuit, each of said inverters having a regulating means responsive to variations in a control voltage for varying the alternating voltage of the output of the inverters, a voltage sensing means connected to the regulating means of one of said inverters and the load circuit for producing a control voltage which varies in accordance with the voltage of said load circuit for maintaining the voltage of said load circuit constant; and means responsive to the ratio between the amounts of current transmitted to the load circuit by the pair of inverters for producing a control voltage which varies in accordance with said ratio and connected to the voltage regulating means of the other of said inverters for varying the voltage of the output of the other of said inverters in accordance with the variations in said ratio to maintain said ratio constant.

4. An electric translating system for transmitting energy from a direct current supply circuit to an alternating current load circuit comprising, a pair of inverters connected in parallel between said supply circuit and said load circuit, each of said inverters having a regulating means responsive to variations in a control voltage for varying the alternating voltage of the inverter; a voltage sensing means connected to load circuit for producing a first control voltage which varies in accordance with the voltage of said load circuit, said voltage sensing means also being connected to the voltage regulating means of one of said inverters whereby said first control voltage and said voltage regulating means maintain the voltage of said load circuit constant; and a current balance sensing transformer having a pair of primary windings and a secondary winding, one of said primary windings being connected to said one of said inverters for inducing a voltage of one polarity in said secondary winding which varies in accordance with the alternating current output of said one of said inverters, the other of said primary windings being connected to the other of said inverters for inducing a voltage of opposite polarity in said secondary winding which varies in accordance with the alternating current output of the other of said inverters, said secondary winding being connected to the voltage regulating means of said other of said inverters whereby the voltage of the output of said other of said inverters varies as the ratio between the alternating current output of said inverters.

5. An electric translating system for transmitting energy from a direct current supply circuit to an alternating current load circuit comprising, at least three inverters connected in parallel between said supply circuit and said load circuit, each of said inverters having a regulating means responsive to variations in a control voltage for varying the alternating voltage of the output of each of the inverters, a voltage sensing means connected to the load circuit producing a first control voltage which varies in accordance with the voltage of said load circuit, said voltage sensing means also being connected to the regulating means of one of said inverters whereby said first control voltage varies the voltage of the output of said one of said inverters to maintain constant the voltage of said load circuit; and a current balance sensing transformer for each of the others of said inverters, each of said current balance sensing transformers having a pair of primary windings and a secondary winding, one of said primary windings of each of said current balance sensing transformers being connected to said one of said inverters for inducing a voltage of one polarity in said secondary winding of each of said current balance sensing transformers which varies in accordance with the alternating current output of said one of said inverters, the other of said primary windings of each of said current balance sensing transformers being connected to its associated inverter for inducing a voltage of opposite polarity in the secondary winding which varies in accordance with the alternating current output of its associated inverter, the secondary winding of each of said current balance sensing transformers being connected to the regulating means of its associated inverter whereby the voltage of the output of each of said other inverters varies as the ratio between its alternating current output and the alternating current output of said one of said inverters.

6. An electric translating system for transmitting energy from a direct current supply circuit to an alternating current load circuit comprising, a plurality of inverters connected in parallel between said supply circuit and said load circuit, each of said inverters having a voltage regulating means including a saturable reactor provided with a direct current saturating winding and a control means responsive to a control voltage for varying the amount of direct current flowing through the saturating winding; a voltage sensing means connected to the load circuit producing a first control voltage which varies in accordance with the voltage of said load circuit, said voltage sensing means also being connected to the control means of the saturable reactor of one of said inverters whereby said first control voltage varies the alternating voltage of the output of said one of said inverters to maintain constant the voltage of said load circuit; and a current balance sensing transformer for every one of the remainder of said plurality of inverters having a pair of primary windings and a secondary winding, one of said primary windings of every said current balance sensing transformer being connected to said one of said inverters for inducing a voltage of one polarity in said secondary winding of every said current balance sensing transformer which varies in accordance with the alternating current output of said one of said inverters, the other of said primary windings of every said current balance sensing transformer being connected to its associated inverter for inducing a voltage of opposite polarity in the secondary winding which varies in accordance with the alternating current output of its associated inverter, the secondary winding of every current balance sensing transformer being connected to the control means of the saturable reactor of its associated inverter, whereby the voltage of the outputs of every one of said remainder of said plurality of inverters varies as the ratio between its alternating current output and the alternating current output of said one of said inverters.

7. An electric translating system for transmitting energy from a direct current supply circuit to an alternating current load circuit comprising a pair of inverters connected in parallel between said supply circuit and said load circuit, each of said inverters having a voltage regulating means including a saturable reactor provided with a direct current saturating winding and a control means responsive to a control voltage for varying the amount of direct current flowing through the saturating winding; a voltage sensing means connected to the load circuit producing a first control voltage which varies in accordance with the voltage of said load circuit, said voltage sensing means also being connected to the control means of the saturable reactor of one of said inverters whereby said first control voltage varies the alternating voltage of the output of said one of said inverters to maintain constant the voltage of said load circuit; and a current balance sensing means connected to said inverters for producing a second control voltage which varies in accordance with the ratio between the alternating current outputs of said inverters, said current balance sensing means also being connected to the control means of the other of said inverters whereby said second control voltage varies the alternating voltage of the output of said other of said inverters to maintain constant said ratio between the alternating current output of said inverters.

8. An electric translating system for transmitting energy from a direct current circuit to a polyphase alternating current circuit comprising at least three inverters connected between said circuits, each of said inverters directly energizing one phase of said polyphase circuit, means for maintaining the alternating current outputs of said inverters differing in phase in a predetermined manner, each of said inverters having a voltage control means for controlling the voltage of its alternating current output, the voltage control means of one of said inverters being responsive to the voltage of said alternating current load circuit to maintain constant the voltage of said load circuit; current balance sensing means for detecting variations in the ratios between the amounts of current transmitted to the load circuit by said one of said inverters and each of the other of said inverters, said voltage regulating means of each of said other inverters being controlled by its associated current balance sensing means to maintain substantially constant the ratios between the amount of current transmitted to the load circuit by each of said other inverters.

9. An electric translating system for transmitting energy from a direct current supply circuit to three phase alernating current load circuit; three inverters connected in parallel between said circuits, each of said inverters directly energizing one phase of said load circuit, means for maintaining the alternating current output of said inverters differing in phase by 120 electrical degrees, each of said inverters having a voltage regulating means responsive to a control voltage; voltage sensing means connected to the voltage regulating means of one of said inverters and to said load circuit for producing a control voltage which varies in accordance with the voltage of said load circuit for maintaining the voltage of said load circuit constant; pair of current balance sensing means responsive to the ratio between the amount of current transmitted to the load circuit by said one of said inverters and each of the other of said inverters for producing control voltages which vary in accordance with said ratios, and means connecting said balance sensing means to each of said other inverters for varying the voltage of the output of each of said other of said inverters in accordance with the variation in said ratios to maintain said ratios constant.

10. The device of claim 9 wherein each of current balance sensing means comprises a plurality of serially connected resistances; current sensing means connected to said one of said inverters for producing a direct potential which varies in accordance with the alternating current output of said one of said inverters, means connecting said current sensing means to one of said resistances for impressing said direct potential across one of said resistances, a current sensing means connected to an associated inverter of said other inverters for producing a direct potential which varies in accordance with the alternating current output of the associated inverter, said direct potentials being of opposite polarities whereby resultant potentials are produced which vary in accordance with the ratios between the alternating current outputs of said one inverter and of said other inverters said voltage regulating means of said other inverter being responsive to said potentials to maintain substantially constant the ratios between the amount of current transmitted to the load circuit by said one of said inverters and the amount of current transmitted to the load circuit by each of said other inverters.

11. An electric translating system comprising a plurality of inverters connected in parallel between a direct current supply circuit and an alternating current load circuit, each of said inverters having a regulator means responsive to a control voltage for maintaining constant the output voltage transmitted to said load circuit by each of said inverters, voltage sensing means connected to said load circuit and the regulator means of one of said inverters for producing a control voltage which varies in accordance with the voltage of said load circuit whereby the voltage of said load is maintained constant with respect to the output voltage of said one of said inverters, current balance sensing means connected to said one of said inverters and the regulator means of the rest of said inverters for producing a control voltage which varies in accordance with the ratio of currents transmitted to said load by said one of said inverters and said rest of said inverters whereby said ratio is maintained constant.

References Cited in the file of this patent
UNITED STATES PATENTS

| | | |
|---|---|---|
| 2,038,505 | Winograd | Apr. 21, 1936 |
| 2,247,785 | Puppe | July 1, 1941 |
| 2,437,837 | Saretzky | Mar. 16, 1948 |